Feb. 21, 1933.   I. WILKINSON   1,898,801
NUT LOCK
Filed Aug. 28, 1929
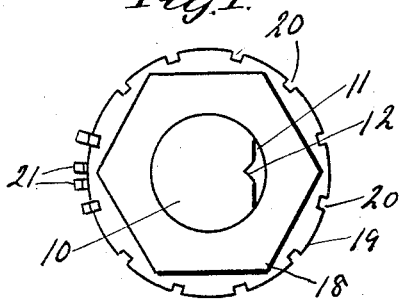
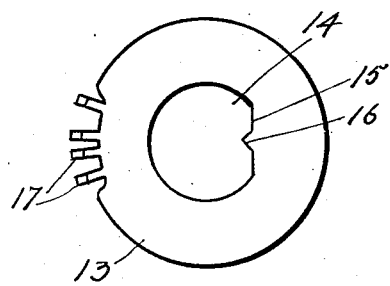
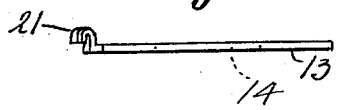
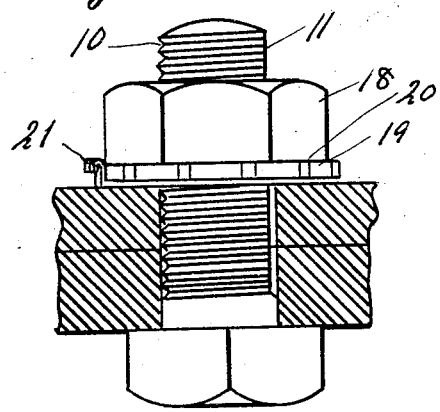
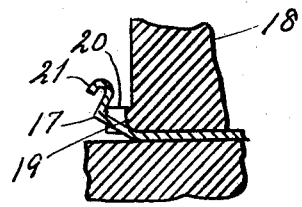
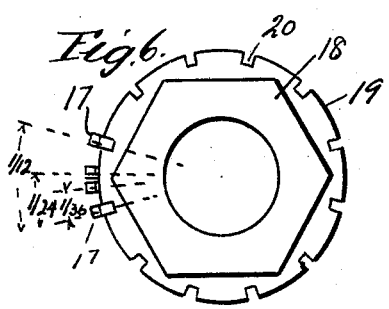
Inventor
Irvine Wilkinson
By W. W. Williamson
Atty.

Patented Feb. 21, 1933

1,898,801

UNITED STATES PATENT OFFICE

IRVINE WILKINSON, OF PHILADELPHIA, PENNSYLVANIA

NUT LOCK

Application filed August 28, 1929. Serial No. 388,886.

My invention relates to new and useful improvements in nut locks and has for its object to provide an exceedingly simple and effective device of this description which will provide for the locking of a nut upon its bolt at various degrees in the rotation of the nut relative to the bolt.

A further object of my invention is to provide a plurality of locking means for engaging a series of notches carried by the nut, any one of which locking means may be brought into action to securely hold the nut against rotation upon the bolt in either direction.

A still further object of my invention is to provide for the ready manipulation of the locking means to put them in the positions for holding the nut against rotation while rendering it exceedingly simple to unlock the locking means.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a plan view of my improved device.

Fig. 2 is a detail view of the locking washer.

Fig. 3 is an edge view of Fig. 2.

Fig. 4 is a view showing the bolt passed through the clamp and the nut seated upon the locking washer.

Fig. 5 is an enlarged fragmentary view showing one of the locking tongues drawn into locking position.

Fig. 6 is a plan view of the nut and the locking washer having radial dotted lines thereon to illustrate the manner of setting up the nut in small degrees.

In carrying out my invention as herein embodied, 10 represents a bolt having a portion of its body flattened longitudinally as indicated at 11 and also having a shallow V-shaped groove 12 formed centrally of said flattened portion.

13 represents the locking washer having a central opening 14 for free passage over the bolt and a straight wall 15, and likewise a V-shaped projection 16 for fitting in the groove 12 so that when this washer is placed upon the bolt, it may freely slide lengthwise thereof but will be held positively against rotation on the bolt. This washer has formed thereon a series of tongues 17 which are variously spaced and as shown in Fig. 6 are here spaced as follows:—

The tongue nearest the bottom of the sheet and the tongue furtherest away therefrom is spaced apart a distance equal to one-twelfth of the circle while the first named tongue and the one next to the last named tongue is one-twenty-fourth of the circle apart and the other tongue is one-thirty-sixth of the circle away from the first named tongue, for the purposes hereinafter explained.

18 represents the nut for threading upon the bolt 14 and this nut has a circular flange 19 at the base thereof, and this flange has formed therein the locking notches 20 into which the tongues 17 may be drawn and when one of these tongues is drawn into one of these notches, it is obvious that the nut will be securely locked upon the bolt against rotation in either direction, and since the locking notches 20 are spaced apart equally, the spacing of the tongues at varying distances apart provides for the locking of the nut at every slight turn thereof and when the tongues are spaced as shown in Fig. 6 this locking may take place at every thirty-sixth of a turn. If desired, a greater number of tongues may be used, giving a greater variety of spacing so as to decrease the degree of a circle through which the nut must be turned to bring it into a locking position and this may be carried to such an extent as to provide for the locking of the nut upon the slightest turn thereof, thus giving great accuracy of adjustment as will be readily understood.

Each of the locking tongues is turned up at right angles and terminates in the hook 21 in order that a tool may be engaged in said hook to bend the tongue upward into one of the notches 20 as clearly shown in Fig. 5. This arrangement provides a ready means for unlocking the nut since it is only necessary to strike the hook of the upturned tongue, a slight hammer blow to carry said tongue out of engagement with the notch and thus free the nut for further rotation in set up or back-off.

In nut locks for certain classes of work, it is highly essential that provision be made for the locking of the nut on slight turns thereof and that when locked, the nut will be held against rotation in either direction and this is effectually accomplished by my invention in a simple and inexpensive manner by spacing the locking tongues apart at varying distances.

Of course I do not wish to be limited to the exact details of construction as herein shown, as these may be varied within the limits of the appended claims without departing from the spirit of my invention.

Having thus fully described my invention, what I claim as new and useful is:—

In a nut lock, a bolt having a longitudinal spline groove, a nut threaded thereon, a flange carried by the base end of said nut and having a plurality of regularly spaced notches about the entire circumference thereof, a washer mounted on the bolt, a projection extending from the inner edge of said washer and registering with the spline groove in the bolt to prevent rotation of the washer on said bolt, and a plurality of locking tongues formed about the exterior circumference of said washer and within an angular space equal to that between a pair of notches on the nut flange, the angular distance between the first and second tongues being an even multiple of that between the second and third, and the distance between the third and fourth being an odd multiple of that between the first and second tongues.

In testimony whereof, I have hereunto affixed my signature.

IRVINE WILKINSON.